(12) United States Patent
Masuda et al.

(10) Patent No.: US 11,675,196 B2
(45) Date of Patent: Jun. 13, 2023

(54) WEARABLE DEVICE WITH IMAGE DISPLAY MODULE

(71) Applicant: BLUE OPTECH CO., LTD., Kyoto (JP)

(72) Inventors: Makoto Masuda, Kyoto (JP); Nobuhiro Shirai, Kyoto (JP)

(73) Assignee: BLUE OPTECH CO., LTD., Kyoto (JP)

(*) Notice: Subject to any disclaimer, the term of this patent is extended or adjusted under 35 U.S.C. 154(b) by 0 days.

(21) Appl. No.: 17/423,214

(22) PCT Filed: Nov. 18, 2019

(86) PCT No.: PCT/JP2019/045074
§ 371 (c)(1),
(2) Date: Jul. 15, 2021

(87) PCT Pub. No.: WO2020/148997
PCT Pub. Date: Jul. 23, 2020

(65) Prior Publication Data
US 2022/0004004 A1    Jan. 6, 2022

(30) Foreign Application Priority Data

Jan. 15, 2019 (JP) .............................. JP2019-004122

(51) Int. Cl.
*G02B 27/01* (2006.01)
*G02B 27/00* (2006.01)

(52) U.S. Cl.
CPC ..... *G02B 27/0172* (2013.01); *G02B 27/0062* (2013.01); *G02B 27/0101* (2013.01); *G02B 27/0179* (2013.01); *G02B 2027/0178* (2013.01)

(58) Field of Classification Search
CPC .... G02B 2027/0132; G02B 2027/0178; G02B 27/0062; G02B 27/0101; G02B 27/0172; G02B 27/0176; G02B 27/0179
See application file for complete search history.

(56) References Cited

U.S. PATENT DOCUMENTS

| 8,861,090 B2 | 10/2014 | Mukawa |
| 9,766,453 B2 | 9/2017 | Mukawa |

(Continued)

FOREIGN PATENT DOCUMENTS

| CN | 103592762 A | 2/2014 |
| CN | 104067159 A | 9/2014 |

(Continued)

OTHER PUBLICATIONS

JPO Office Action for corresponding JP Application No. 2019-004122; dated Jul. 6, 2021.

(Continued)

*Primary Examiner* — Ram A Mistry
(74) *Attorney, Agent, or Firm* — Cantor Colburn LLP

(57) ABSTRACT

A wearable image display device eliminates the need to adjust an image focus every time the device is used. The present invention includes a mounting module and a right image display module, and a left image display module. Each of the right image display module, the left image display module includes a reflective image modulation device, a lens, a light guide plate, and a plurality of half mirrors. The lens is disposed in a state eccentric to a predetermined value with respect to the reflective image modulation device. As a result, the present invention eliminates the need to adjust the image focus every time the device is used.

6 Claims, 14 Drawing Sheets

(56) References Cited

U.S. PATENT DOCUMENTS

| | | | |
|---|---|---|---|
| 2012/0044571 A1 | 2/2012 | Mukawa | |
| 2014/0049831 A1* | 2/2014 | Takeda | G02B 27/0172 359/630 |
| 2014/0334010 A1 | 11/2014 | Mukawa | |
| 2014/0340286 A1 | 11/2014 | Machida et al. | |
| 2015/0198808 A1 | 7/2015 | Morifuji et al. | |
| 2015/0212328 A1 | 7/2015 | Enokido | |
| 2017/0322420 A1 | 11/2017 | Machida et al. | |
| 2018/0120573 A1 | 5/2018 | Ninan et al. | |
| 2018/0164583 A1 | 6/2018 | Wall et al. | |
| 2020/0323728 A1* | 10/2020 | Park | G02F 1/29 |
| 2021/0325684 A1 | 10/2021 | Ninan et al. | |

FOREIGN PATENT DOCUMENTS

| | | | |
|---|---|---|---|
| CN | 105899998 A | 8/2016 | |
| CN | 107290857 A | 10/2017 | |
| CN | 108051925 A | 5/2018 | |
| CN | 104508538 B | 6/2018 | |
| CN | 108693645 A | 10/2018 | |
| EP | 0575257 A2 | 12/1993 | |
| EP | 2808725 A | 12/2014 | |
| JP | H08160344 A | 6/1996 | |
| JP | 2002182149 A | 6/2002 | |
| JP | 2012042654 A | 3/2012 | |
| JP | 2013044834 A | 3/2013 | |
| JP | 6202117 B2 | 9/2017 | |
| TW | I461735 B | 11/2014 | |
| TW | I622806 B | 5/2018 | |
| WO | WO-2010044356 A1 * | 4/2010 | G02B 17/0832 |
| WO | 2013175465 A1 | 11/2013 | |
| WO | 2014017348 A1 | 1/2014 | |

OTHER PUBLICATIONS

International Search Report for International Application No. PCT/JP2019/045074; dated Jan. 28, 2020.

CNIPA The First Office Action for corresponding CN Application No. 201980087868.0; dated Oct. 11, 2022.

EPO Extended European Search Report for corresponding EP Application No. 19910119.7; dated Sep. 22, 2022.

* cited by examiner

FIG.14

| TARGET PERSONS | NUMBER OF PERSONS | AVERAGE VALUE | STANDARD DEVIATION | PERCENTILE | | | | |
|---|---|---|---|---|---|---|---|---|
| | | | | 1 | 5 | 50 | 95 | 99 |
| (A) | 100 | 61.1 | 2.6 | 55 | 57 | 61 | 66 | 67 |
| (B) | 100 | 64.4 | 3.0 | 57 | 60 | 65 | 69 | 71 |
| (C) | 61 | 61.7 | 2.7 | 57 | 58 | 62 | 65 | 68 |
| (D) | 56 | 64.1 | 3.0 | 60 | 60 | 64 | 69 | 71 |

(A) ELDERLY FEMALE GROUP
(B) ELDERLY MALE GROUP
(C) YOUTH FEMALE GROUP
(D) YOUTH MALE GROUP

WEARABLE DEVICE WITH IMAGE DISPLAY MODULE

CROSS REFERENCE TO RELATED APPLICATIONS

This is the U.S. national stage of application No. PCT/JP2019/045074, filed on Nov. 18, 2019. Priority under 35 U.S.C. § 119(a) and 35 U.S.C. § 365(b) is claimed from Japanese Application No. 2019-004122, filed Jan. 15, 2019, the disclosure of which is also incorporated herein by reference.

TECHNICAL FIELD

The present invention relates to a binocular-type wearable image display device.

BACKGROUND

As For example, Patent Document 1 discloses a binocular-type wearable image display device. The display device of Patent Document 1 includes an eyeglass-type frame attached to a head of a user (observer, spectator), and two image display units attached to the left and right sides of the frame, respectively. The display device of Patent Document 1 displays an image (virtual image) on the two image display units, so that the user can view an image of the outside world superimposed on the displayed image.

The two image display units in the display device of Patent Document 1 include a moving unit including a motor and a pinion gear or the like, an image forming device, and an optical system. The two image display units in the display device of Patent Document 1 adjusts the position of the image so that the user can see it, by relatively moving the optical axis of the image display device and the optical axis of the optical system in the horizontal direction (X-axis direction) by the moving unit,

PRIOR ART DOCUMENT

Patent Document

[Patent Document 1] Japanese Patent No. 6202117

SUMMARY OF THE INVENTION

Problem to be Solved by the Invention

However, the display device of Patent Document 1 need to operate the moving unit every time it is used to adjust the position of the image (focus of the image) so that the user can see it. That is, the display device of Patent Document 1 needs to adjust the position of the image every time the device is used.

A problem to be solved by the present invention is to provide a wearable image display device that does not need to adjust a position of the image every time the device is used.

Means for Solving the Problem

A wearable image display device of the present invention includes a mounting module mounted on a face of a user, a right image display module arranged on a right side of the mounting module so as to correspond to a right eye of the user, and a left image display module arranged on a left side of the mounting module so as to correspond to a left eye of the user, each of the right image display module and the left image display module includes an image output device outputting an image as an image light, a lens adjusting a position of the image output from the image output device, a light guide plate making the image light output from the image output device incident and guiding the incident image light by a light guiding action, and a plurality of half mirrors, which are disposed in the light guide plate, making the image light guided through the light guide plate incident on the right eye from a surface of the light guide plate in the case of the right image display module, making the image light incident on the left eye from a surface of the light guide plate in the case of the left image display module, and displaying the image in a space of a back surface side of the light guide plate. In at least one of the right image display module and left image display module, the lens is disposed in a state eccentric to a predetermined value with respect to the image output device.

According to the wearable image display device of the present invention, it is preferable that the lens in the right image display module and left image display module is disposed in a state eccentric to a predetermined value with respect to the image output device, and the predetermined value is a value such that a right image display direction and a left image display direction intersect at a point on a linear perpendicular bisector connecting the right eye and the left eye, the right image display direction displaying the image of the right image display module and the left image display direction displaying the image of the left image display module.

According to the wearable image display device of the present invention, it is preferable that when a state before the lens is eccentric is a reference state, the predetermined value is obtained from: either a right image display distance in the right image display module in the reference state, which is a distance from the right eye to a position where the image is displayed, or a left image display distance in the left image display module in the reference state, which is a distance from the left eye to a position where the image is displayed; and a half of a width between the right eye and the left eye.

According to the wearable image display device of the present invention, it is preferable that the predetermined value satisfies the following equation (1):

$$\theta = \arctan\{(d/2)/D\} \qquad (1),$$

where θ is an angle define by a center line which is a linear perpendicular bisector connecting the right eye and the left eye, and a right line-of-sight or a left line-of-sight which is a line segment from the right eye or the left eye to a point on the center line, where d is a width between the right eye and the left eye, and where D is, when a state before the lens is eccentric is a reference state, either a right image display distance in the right image display module in the reference state, which is a distance from the right eye to a position where the image is displayed, or a left image display distance in the left image display module in the reference state, which is a distance from the left eye to a position where the image is displayed.

According to the wearable image display device of the present invention, it is preferable that the width is obtained from an average value of multiple people in at least one of gender, age and region.

According to the wearable image display device of the present invention, it is preferable that in at least one of the right image display module and the left image display module, a first component including the light guide plate and the plurality of half mirrors and a second component including the image output device and the lens are separately provided as a part structure, the first component is attached to the mounting module, and the second component is detachably attached to the first component.

According to the wearable image display device of the present invention, it is preferable that an adjustment mechanism is provided between the mounting module and at least one of the right image display module and the left image display module, and the adjustment mechanism allows at least one position of the right image display module and the left image display module to be adjusted with respect to the mounting module.

According to the wearable image display device of the present invention, it is preferable that the adjustment mechanism includes: a fixing part attached to the mounting module, a moving part to which at least one of the right image display module and the left image display module is attached, and that is movably attached to the fixing part, and an adjustment part capable of adjusting a position of the moving part with respect to the fixing part.

Effect of the Invention

The wearable image display device of the present invention eliminates the need to adjust a position of the image every time the device is used.

BRIEF DESCRIPTION OF THE DRAWINGS

FIG. 14 is an explanatory diagram showing the dimensions (part: mm) of the widths (width between among pupils) between the right eyes and the left eyes of the Japanese.

MODE FOR CARRYING OUT THE INVENTION

Figure 1:
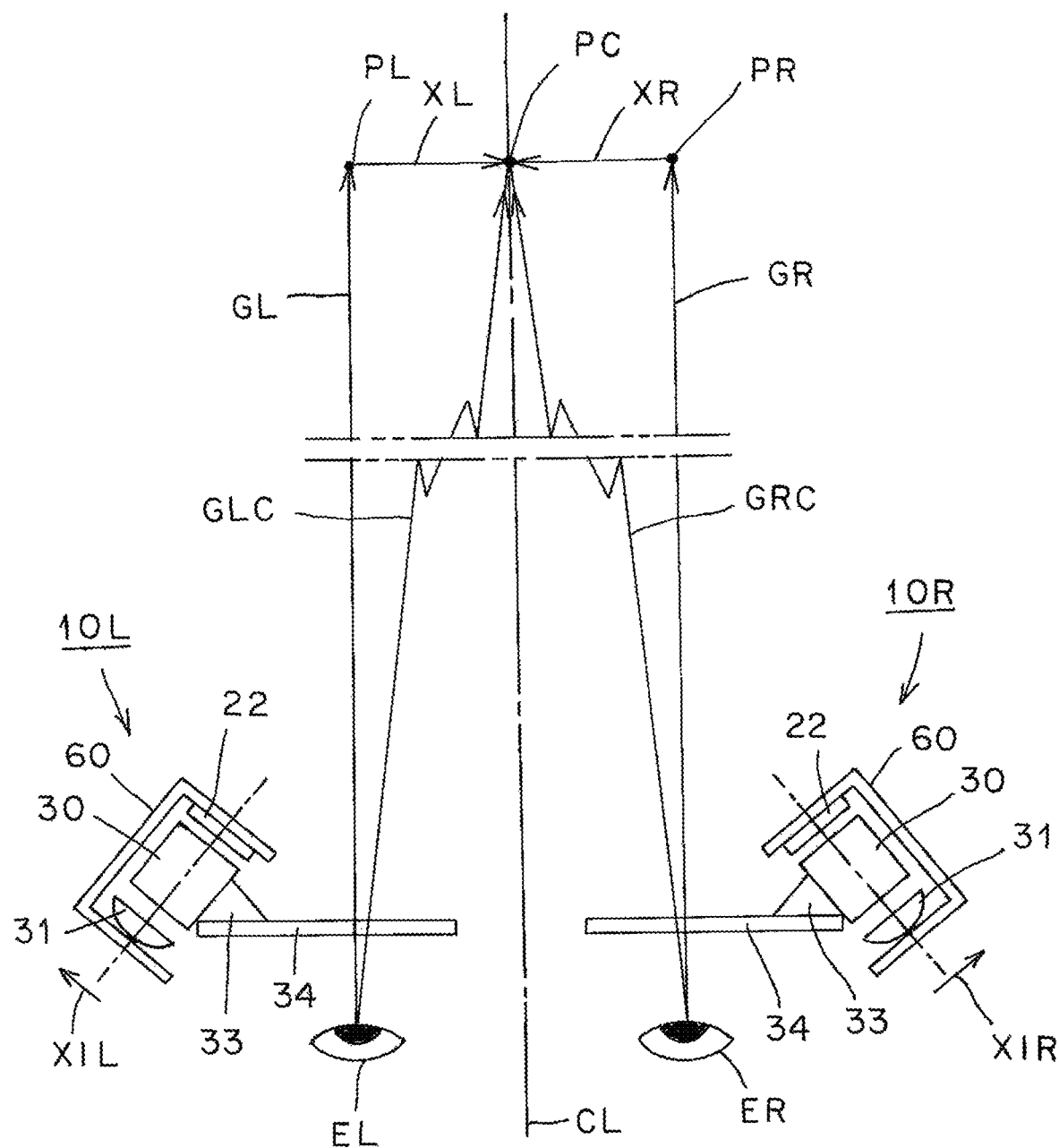
FIG. 1 is an explanatory diagram showing an embodiment of a wearable image display device according to the present invention.

Hereinafter, an example of an embodiment of a wearable image display device according to the present invention will be described in detail with reference to the drawings. Since the drawings are schematic diagrams showing the wearable image display device according to the present invention, detailed portions of the wearable image display device according to the present invention are omitted in the drawings. Further, in the drawings, some components are hatched and the other components are not hatched.

Description of Configuration in the Embodiment

Hereinafter, a configuration of a wearable image display device according to this embodiment will be described. In the figures, reference numeral 1 denotes a wearable image display device according to this embodiment. Reference numeral X denotes a left-right direction with reference to a user (or wearer; hereinafter, referred to as a user). Reference numeral Y denotes a front-back direction with reference to the user. Reference numeral Z denotes an up-down direction with reference to the user.

(Description of Wearable Image Display Device 1)

As shown in FIGS. 1 to 4, the wearable image display device 1 is a binocular-type wearable image display device, including a mounting module 5, a right image display module 10R, a left image display module 10L, and an adjustment mechanism 8.

The mounting module 5 is mounted on a face of the user (or a head of the user; hereinafter referred to as the face). The right image display module 10R is arranged on the right side of the mounting module 5 via the adjustment mechanism 8 so as to correspond to a right eye ER of the user. The left image display module 10L is arranged on the left side of the mounting module 5 via the adjustment mechanism 8 so as to correspond to a left eye EL of the user.

(Description of Mounting Module 5)

Figure 2:
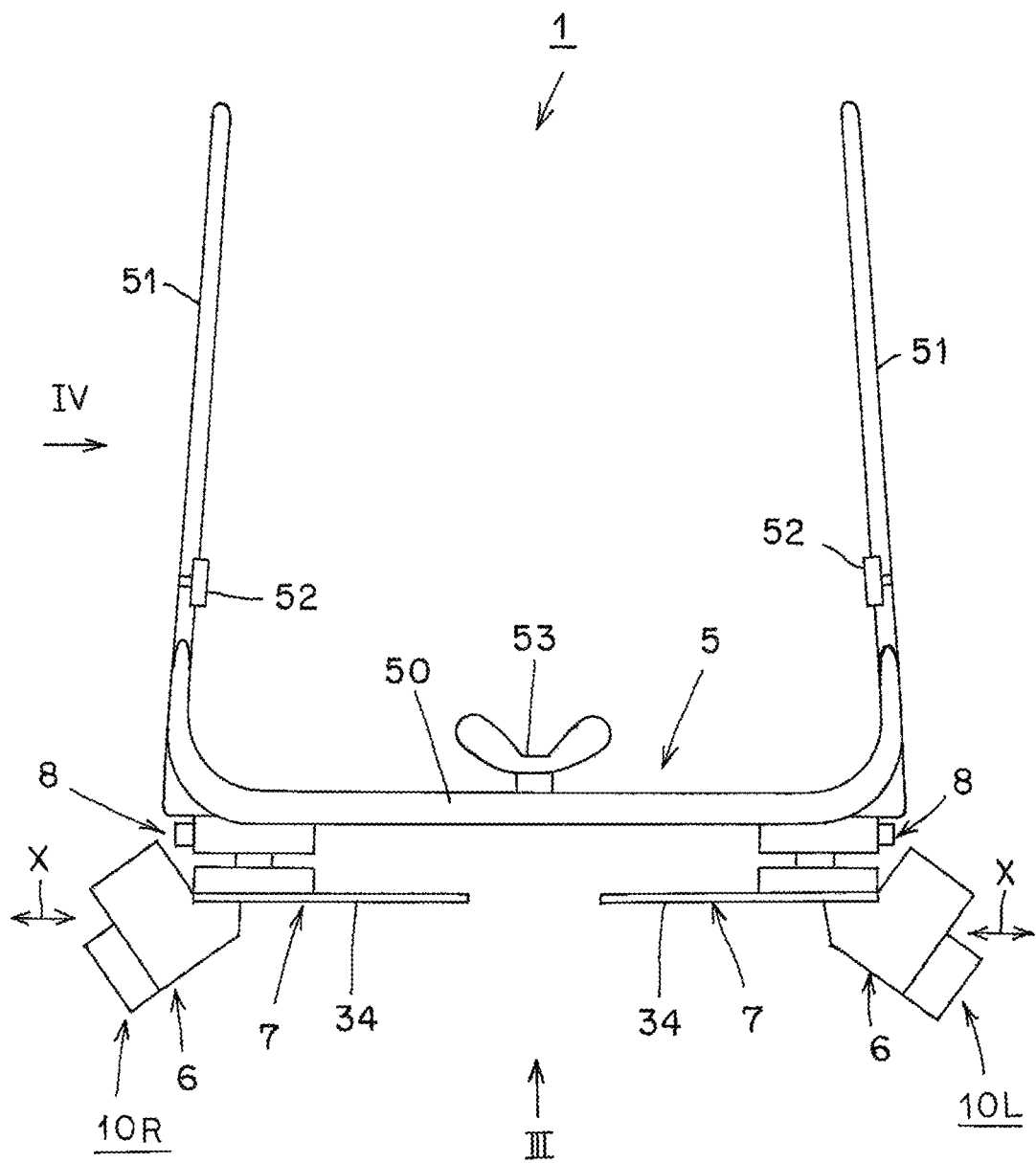
FIG. 2 is a plan view showing the wearable image display device.
Figure 3:
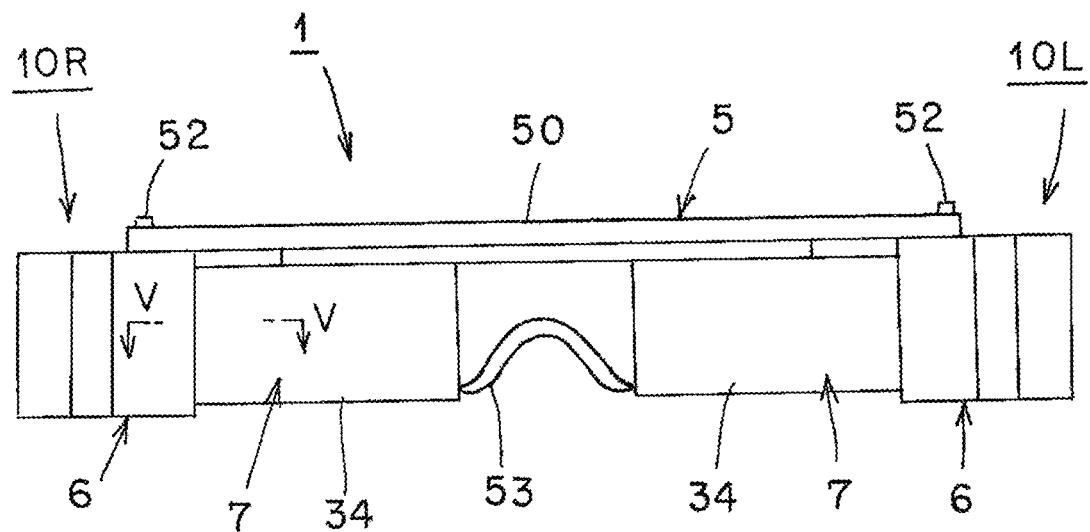
FIG. 3 is a front view showing the wearable image display device (III arrow view in FIG. 2).
Figure 4:
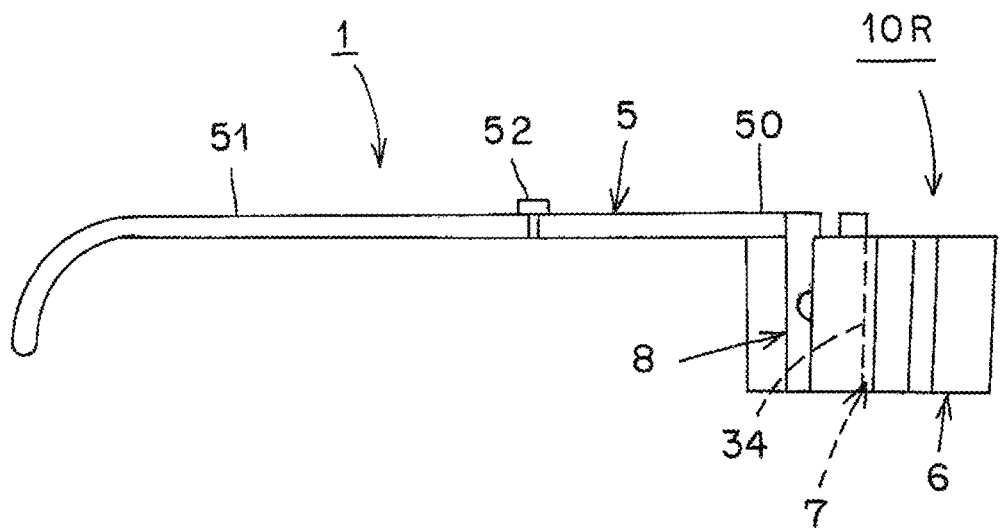
FIG. 4 is a right side view showing the wearable image display device (IV arrow view in FIG. 2).
Figure 5:
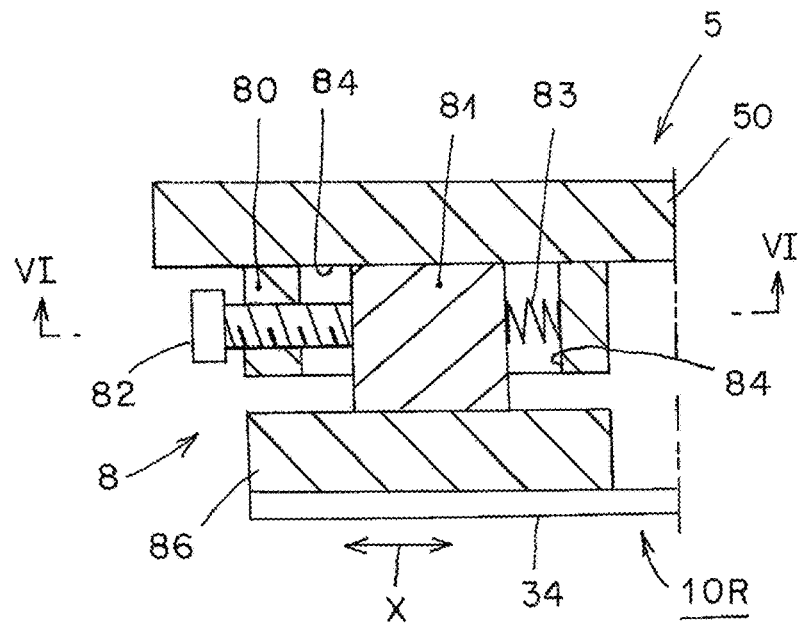
FIG. 5 is a horizontal sectional view showing an adjustment mechanism of the wearable image display device (V-V line sectional view in FIG. 3).
Figure 6:
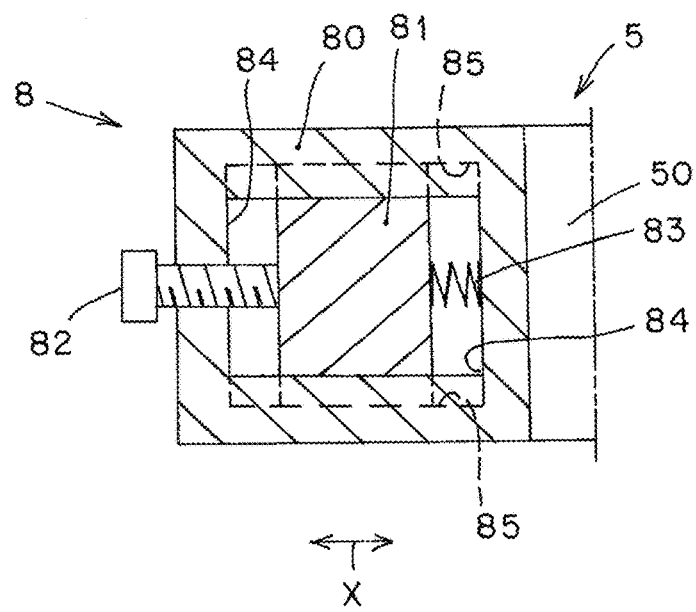
FIG. 6 is a longitudinal sectional view showing an adjustment mechanism of the wearable image display device (VI-VI line sectional view in FIG. 5).
Figure 7A:
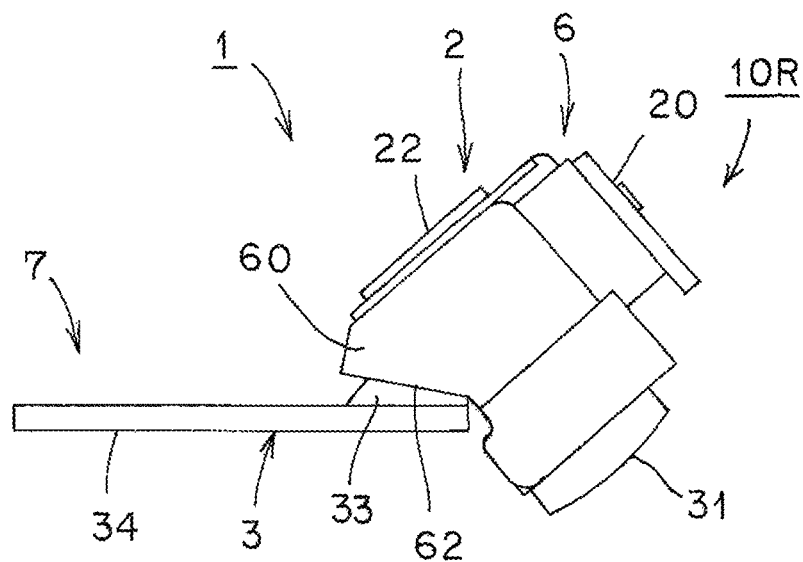
FIG. 7A is an explanatory diagram illustrating a state in which an image source side portion and an image display side portion in the right image display module are integrally assembled.
Figure 7B:
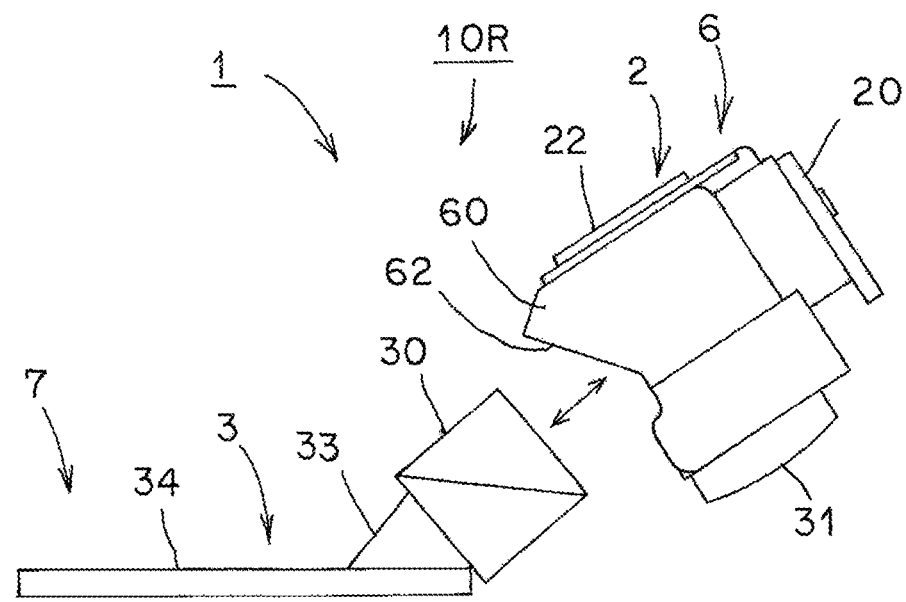
FIG. 7B is an explanatory diagram showing a state in which the image source side portion and the image display side portion in the right image display module are detached separately.
Figure 8:
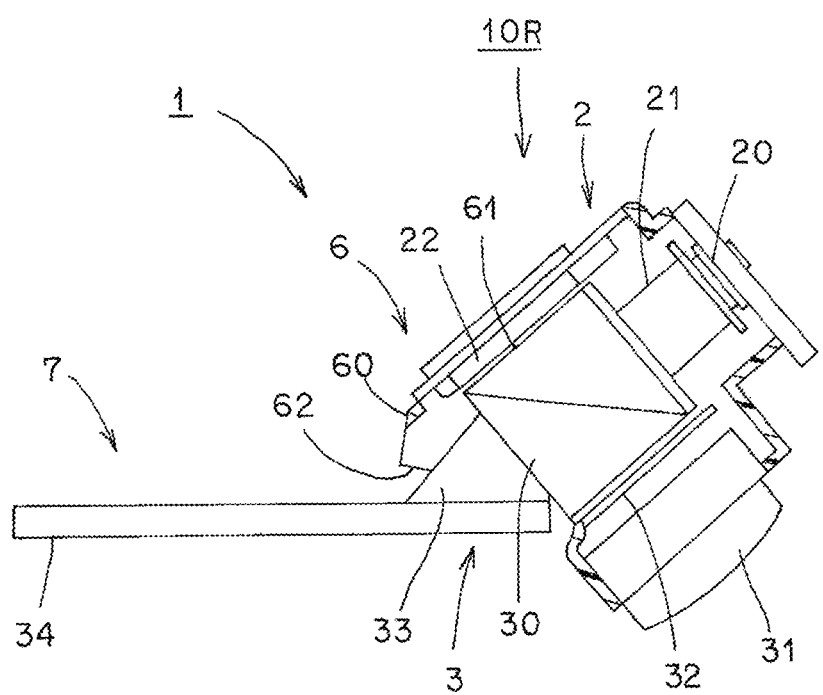
FIG. 8 is an explanatory diagram of a partial cross-section showing a state in which the image source side portion (second component) and the image display side portion (first component) in the right image display module are integrally assembled.
Figure 9:
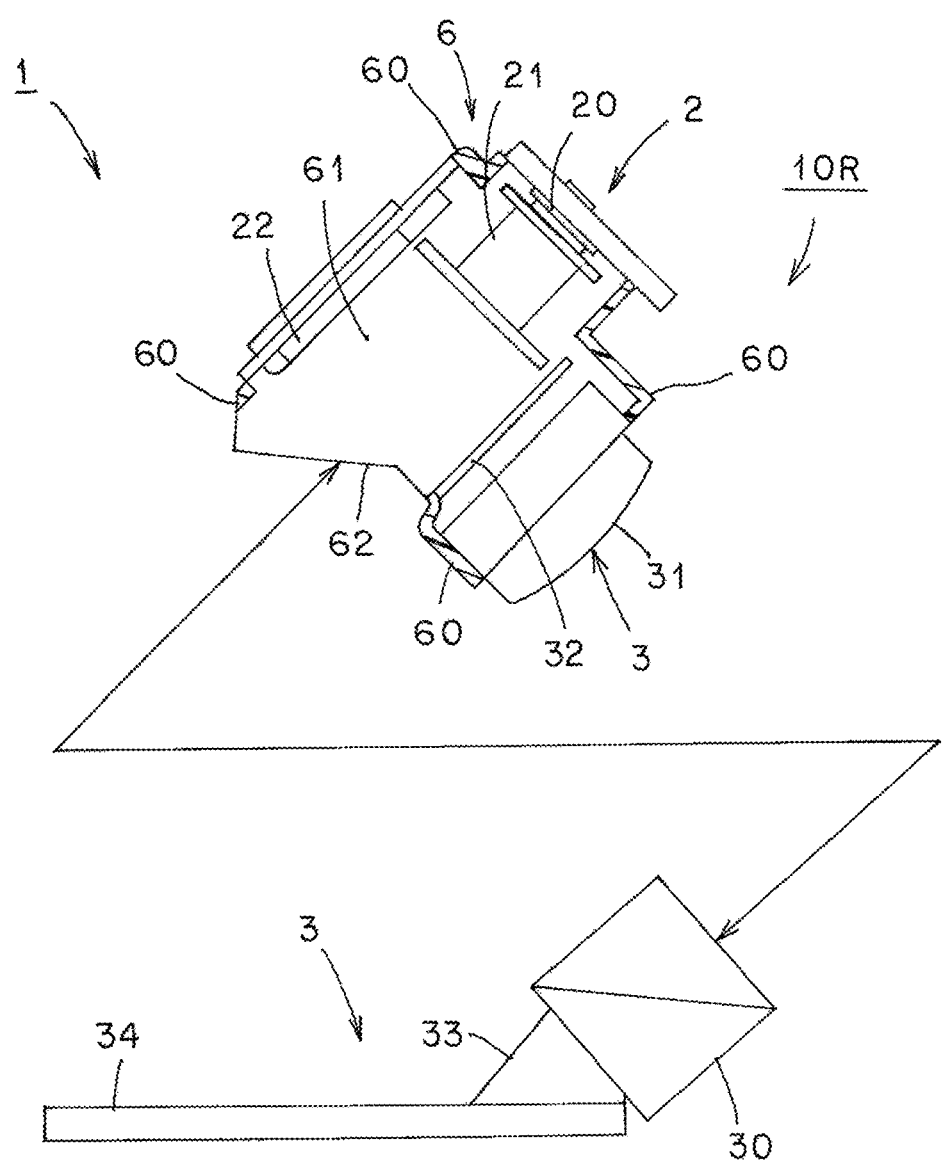
FIG. 9 is an explanatory diagram of a partial cross-section showing a state in which the image source side portion (second component) and the image display side portion (first component) in the right image display module are detached separately.

As shown in FIGS. 2-4, the mounting module 5, in this example, forms an eyeglass-type that is mounted on the face of the user. The mounting module 5 includes a front portion 50, and left and right temple portions 51, 51. The left and right temple portions 51, 51 are foldably attached to the left and right ends of the front portion 50 via left and right hinges 52, 52. A nose pad 53 is provided in a lower part of the center of the front portion 50.

The right image display module 10R is attached to the right side of the front portion 50 via the adjustment mechanism 8. The left image display module 10L is attached to the left side of the front portion 50 via the adjustment mechanism 8.

(Description of Adjustment Mechanism 8)

As shown in FIGS. 2 and 4 to 6, the adjustment mechanism 8 can adjust the positions of the right image display module 10R and the left image display module 10L in the left-right direction X with respect to the mounting module 5. The left-right direction X is the direction connecting the right-eye ER and left-eye EL of the user.

The adjustment mechanism 8 includes a fixing part 80, a moving part 81, an adjustment screw 82 and a spring 83 as an adjustment part. A rectangular space portion 84 is provided in the central portion of the fixing part 80. A guide part 85 are provided on inner surfaces (surfaces facing the space portion 84) of the upper and lower wall portions of the fixing part 80.

The moving part 81 is housed in the space portion 84 of the fixing part 80. A vertical dimension of the moving part 81 is larger than a vertical dimension of the space portion 84, whereas a lateral dimension of the moving part 81 is smaller than a lateral dimension of the space portion 84. The upper and lower end portions of the moving part 8 are guided to the upper and lower guide parts 85 of the fixing part 80. As a result, the moving part 81 is movably attached to the fixing part in the left-right direction 80 via the guide part 85.

The adjustment screw 82 is attached to the central portion of an outer wall portion of the fixing part 80. A head of the adjustment screw 82 located on the outside of the outer wall portion of the fixing part 80 protrudes outwardly from the fixed part 80. On the other hand, a tip of the screw portion of the adjustment screw 82 located inside the outer wall portion of the fixing part 80 is in contact with an outer surface of the moving part 81.

The spring 83 is interposed in a compressed state between the inner surface of the inner wall portion of the fixing part 80 and the inner surface of the moving part 81. As a result, when screwing the adjustment screw 82 against a spring force of the spring 83, it is possible to move the moving part 81 inward. On the other hand, when the adjustment screw 82 is screwed back, the spring force of the spring 83 allows the moving part 81 to move outward.

Here, "outward" means the right side in the case of the right image display module 10R, and the left side in the case of the left image display module 10L. On the other hand, "inward" means the left side in the case of the right image display module 10R, and the right side in the case of the left image display module 10L.

The fixing part 80 is attached to each of the left and right ends of the front portion 50 of the mounting module 5. On the other hand, the moving part 81 is attached to each of a light guide plate 34 of the right image display module 10R and the left image display module 10L via a mounting bracket 86. As a result, each of the adjustment mechanism 8 can move the right image display module 10R and the left image display module 10L in the left-right direction X.

(Description of Right Image Display Module 10R and Left Image Display Module 10L)

Hereinafter, the right-side image display module 10R will be described in detail with reference to FIG. 7A, FIG. 7B, and FIGS. 8 to 11. Incidentally, the left image display module 10L is equal to a structure obtained by horizontally inverting the right image display module 10R. That is, the structure of the right image display module 10R is obtained by only horizontally inverting the left image display module 10L, which means the right image display module 10R and the left image display module 10L have the same structure. Accordingly, a description of the left image display module 10L will be omitted.

The right image display module 10R includes an image light output part 2, an image light transmitting part 3, and an image light emitting part 4.

The image light output part 2 and a part of the image light transmitting part 3 constitute an image source side portion (second component) 6 that is an incident side portion. The remaining image light transmitting part 3 and the image light emitting part 4 constitute an image display side portion (first component) 7 that is an emitting side portion, that is, the portion to be viewed. The image source side portion 6 and the image display side portion 7 are separately provided as a part structure. As a result, the image source side portion 6 and the image display side portion 7 are detachable from each other.

(Description of Image Light Output Part 2)

As shown in FIG. 7A, FIG. 7B and FIGS. 8 to 10, the image light output part 2 outputs an image light L2 using a homogenized light (hereinafter, referred to as "a regulated light") L1 as a transmission medium. Note that the image to be displayed and the displayed image (image to present a virtual image to the user) are not specifically shown. The image light output part 2 includes a light source 20, a light regulation part 21, and a reflective image modulation device 22 as an image output device.

The light source 20 is a backlight, which irradiates (radiates) a light. The light source 20, in this example, includes a substrate 200, and one or more LEDs 201 mounted on the substrate.

The light regulation part 21 regulates the light from the light source 20 to homogenize its color and intensity, to thereby obtain the regulated light L1. The light regulation part 21, in this example, includes a first diffusion sheet 211, a reflective sheet duct 210, a second diffusion sheet 212, a prism sheet 213, a wire grid film 214, and a polarizing plate 215 from the light source 20 side.

The reflective sheet duct 210 forms a reflective sheet in a duct shape, and an inner surface of the reflective sheet duct 210 forms a reflective surface. The reflective sheet duct 210, in this example, forms a square duct shape with a cross section perpendicular to the center line of the duct. The reflective sheet duct 210 may have a cross-sectional shape other than a square shape, for example, a cylindrical shape such as a rectangle, a circle, or an ellipse.

The first diffusion sheet 211, the reflective sheet duct 210, the second diffusion sheet 212 and the prism sheet 213 irradiate a light from the light source 20 evenly and concentratedly on the reflective image modulation device 22. That is, a red light, a green light and a blue light from the light source 20 are converged as white light to a square (or a shape corresponding to cross-sectional shape of the reflective sheet duct 210 such as a rectangle, a circle, or an ellipse) to hit the reflective image modulation device 22.

The wire grid film 214 and the polarizing plate 215 polarize the light from the light source 20 to the light whose polarization direction is adjusted with respect to a polarizing beam splitter 30 described later, in this example, the light of S polarization component.

The reflective image modulation device 22 is, in this example, a reflective liquid crystal (LCOS). The reflective image modulation device 22 is reflects the regulated light L1 from the optical regulation part 21, that is, the regulated light L1 reflected from the polarizing beam splitter 30, and outputs the image light L2 by using the regulated light L1 as a medium. That is, the reflective image modulation device 22 rotates only the image light L2 of the regulated light L1 by 90 degrees to obtain a P polarization component.

Here, the image light output part 2 is configured to output the image light L2 by the reflection type image modulation; however, the image light output part 2 can also be configured to output the image light L2 directly using an organic LED device.

(Description of Image Light Transmitting Part 3)

As shown in FIG. 7A, FIG. 7B, and FIGS. 8 to 11, the image light transmitting part 3 transmits the image light L2 output from the image light output part 2. The image light transmitting part 3 includes a polarizing beam splitter 30, a lens 31, a ¼λ, wave plate (¼ wave plate or λ/4 wave plate) 32, a optical repeater 33, and a light guide plate 34.

The polarizing beam splitter 30, in this example, is a cube-shaped polarizing beam splitter 30, and configured by sandwiching a wire grid film 301 on the slope of two right-angled prisms 300. The polarizing beam splitter 30 transmits the P polarization component of the light (regulated light L1 and image light L2), while reflecting the S polarization component of the light (regulated light L1 and image light L2). As a result, the polarizing beam splitter 30 reflects the regulated light L1 (light of S polarization component) from the light regulation part 21 on the reflective image modulation device 22 side. Further, the polarizing beam splitter 30 transmits the image light L2 (light of P polarization component) from the reflective image modulation device 22 through the ¼λ, wave plate 32 and the lens 31 side. Furthermore, the polarizing beam splitter 30 reflects the image light L2 (light of S polarization component) from the lens 31 and ¼λ, wave plate 32 on the optical repeater 33 side.

The lens 31 is an enlarged lens, and includes a lens part (aspherical optical lens) 311 having a reflecting surface 310. The lens 31 reflects the image light L2 from the reflective image modulation device 22 transmitting through the polarizing beam splitter 30 on the polarizing beam splitter 30 side. The lens 31 also adjusts the positions of the images PC, PL, and PR (focusing of images PC, PL, and PR). Incidentally, an alignment of the images PC, PL, and PR by the lens 31 will be described in detail later with reference to FIG. 12.

The ¼λ, wave plate 32 is disposed between the polarizing beam splitter 30 and the lens 31. The ¼λ, wave plate 32 rotates the polarization direction of the image light L2 from the reflective image modulation device 22 by 90 degrees before incident on the lens 31 and after the reflection from the lens 31.

As a result, the image light L2 from the reflective image modulation device 22 transmits through the ¼λ, wave plate 32 from the polarizing beam splitter 30 side to the lens 31 side, and transmits through the ¼λ, wave plate 32 from the lens 31 side to the polarizing beam splitter 30 side. Thus, the image light L2 from the reflective image modulation device 22 which transmits through the ¼λ, wave plate 32 twice changes to the light of S polarization component from the light of the P polarization component, and is reflected on the optical repeater 33 side in the polarizing beam splitter 30.

The optical repeater 33, in this example, includes a triangular prism. The optical repeater 33 transmits and relays the image light L2 from the reflective image modulation device 22 to the light guide plate 34, the image light L2 is transmitted through the polarizing beam splitter 30, transmitted through the ¼λ, wave plate 32, reflected by the lens 31, transmitted through the ¼λ, wave plate 32 again and emitted by reflection at the polarizing beam splitter 30.

In this embodiment, the light guide plate 34 is made of a colorless transparent resin material such as acrylic resin or PC (polycarbonate), PMMA (polymethylmethacrylate, methacrylic resin), or a colorless transparent glass. The light guide plate 34 guides the incident image light L2, which is transmitted and relayed from the optical repeater 33, to the image light emitting part 4 by a light guiding action (a total reflection action).

The light guide plate 34 forms a plate shape, and includes two main surfaces (i.e., a front surface 341 and a back surface 340) and four auxiliary surfaces (i.e., upper surface, lower surface, left end surface and right end surface). The light guide plate 34 guides the image light L2 to the image light emitting portion 4 by a light guide action on the two main surfaces (the front surface 341 and the back surface 340). Here, as shown in FIG. 11, the front surface 341 of the light guide plate 34 faces the right-eye ER side of the user, and the back surface 340 of the light guide plate 34 faces the background side (spatial side where image is displayed as virtual image).

A transparent plate (not shown) for protecting the light guide plate 34 may be fixed to at least one of the front surface 341 and the back surface 340 of the light guide plate 34. Further, the light guide plate 34 is attached to the moving part 81 of the adjustment mechanism 8 via a mounting bracket 86 of the adjustment mechanism 8. A portion where the light guide plate 34 attached has no effect on the light guide action of the light guide plate 34 and the image visibility of the light guide plate 34.

(Description of Image Light Emitting Part 4)

Figure 11:
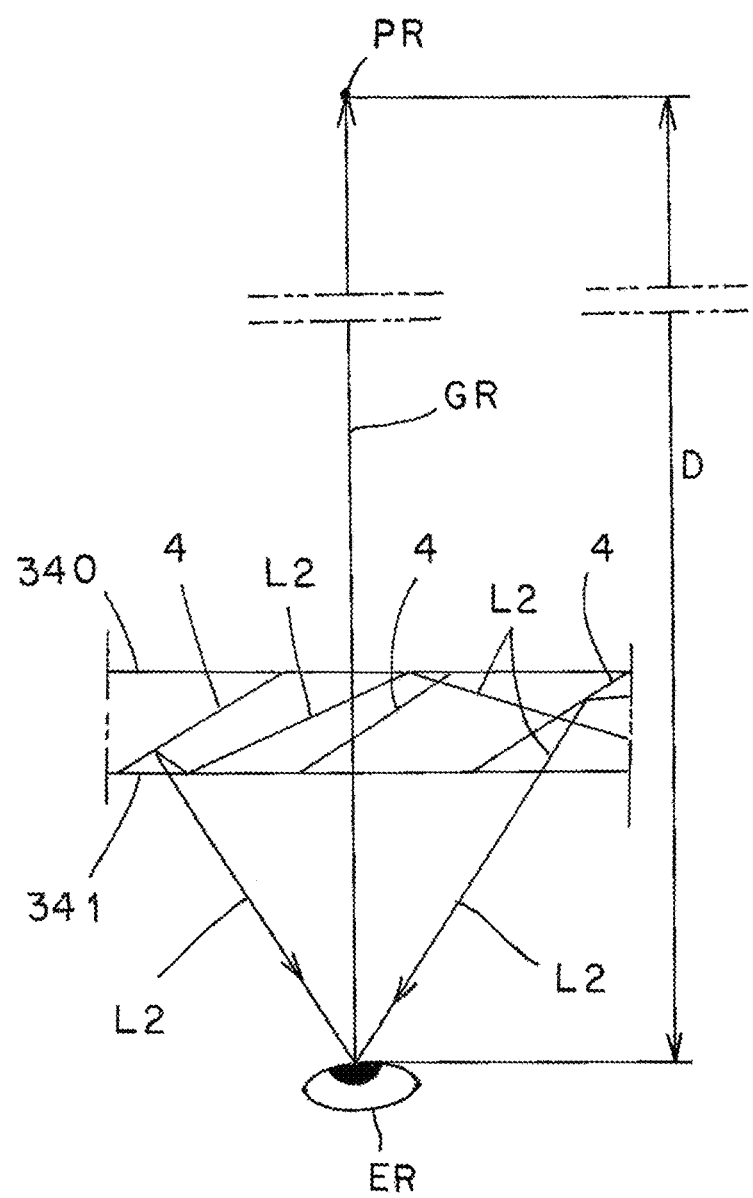
FIG. 11 is an explanatory diagram showing a state (reference state) before a lens is eccentric to a predetermined value in the right image display module, and a state in which an image light is incident on the right eye to display an image (virtual image).

As shown in FIG. 11, the image light emitting part 4 emits the image light L2 transmitted from the image light transmitting part 3 to the outside. The image light emitting part 4 includes a plurality of half mirrors which are disposed in the light guide plate 34 and emit the image light L2 guided through the light guide plate 34 to the outside (hereinafter, the image light emitting part is referred to as a half mirror).

The half mirror 4 is formed by laminating a dielectric layer film. Further, a front surface of the half mirror 4 faces the front surface 341 of the light guide plate 34, the back surface 340 of the half mirror 4 faces the back surface 340 of the light guide plate 34.

The image light L2 reflected on the front surface of the half mirror 4 is emitted to the outside from the front surface 341 of the light guide plate 34 and is incident on the right eye ER of the user. The image light L2 incident on the right-eye ER of the user forms a virtual image in the space of the back surface 340 side of the light guide plate 34. Thus, the user can visually recognize the image.

Here, the wearable image display device 1 according to this embodiment is intended to be used as AR (a technique of superimposing information on a real background). Therefore, when the user visually recognizes the image emitted from the plurality of half mirrors 4 in the light guide plate 34, the background light (not shown) also transmits through the light guide plate 34 and a plurality of half mirrors 4 to be incident on the right-eye ER of the user.

(Description of an Image Source Side Portion (Second Component) 6)

As shown in FIG. 7A, FIG. 7B and FIGS. 8 to 10, the image source side portion (second component) 6 includes the light source 20, the light regulation part 21, the reflective image modulation device 22, the lens 31, and the ¼λ wave plate 32 to be formed as a part structure. The image source side portion 6 has a mounting member 60.

The mounting member 60 is formed of a hollow-shaped housing or casing. A surface of the mounting member 60 is surface-treated. The surface treatment prevents the light, the regulated light L1 and the image light L2 from the light source 20 from being reflected and becoming stray light. For example, the surface is black.

The reflective image modulation device 22, the lens 31, and the ¼λ wave plate 32 are attached to the mounting member 60 so as to face each other with a space 61 in between. The light source 20 and the light regulation part 21 are attached to the mounting member 60 in a direction intersecting the opposite direction of the reflective image modulation device 22, the lens 31, and the ¼λ wave plate 32.

An opening 62 is provided in a portion of the mounting member 60 that faces the light source 20 and the light regulation part 21 with the space 61 in between. The opening 62 communicates with the space 61 such that the polarizing beam splitter 30 of the image display side portion 7 is retractably housed in the space 61.

(Description of Image Display Side Portion (First Component) 7)

As shown in FIG. 7A, FIG. 7B and FIGS. 8 to 10, the image display side portion (first component) 7 includes the polarizing beam splitter 30, the optical repeater 33, the light guide plate 34, and the plurality of half mirrors 4 to be formed as a part structure. In the image display side portion 7, the polarizing beam splitter 30 and the optical repeater 33 are fixed to each other, and the optical repeater 33 and the light guide plate 34 are fixed to each other.

A cover (not shown) may be provided on at least one of the polarizing beam splitter 30, the optical repeater 33, and the light guide plate 34. The cover does not interfere with an optical path of the regulated light L1 and the image light L2, and also does not interfere with an image entering the right-eye ER of the user from the light guide plate 34.

(Description of Mounting Structure)

The mounting structure for detachably attaching the image source side portion 6 of the part structure and the image display side portion 7 of the part structure is provided on the mounting member 60 of the image source side portion 6 and the cover of the image display side portion 7. As the mounting structure, for example, there are an elastic fitting structure of unevenness, a screw fixing structure, a structure using a separate set screw, and the like. Incidentally, the mounting structure of the image display side portion 7 may not be a cover, but may be provided on at least one of the polarizing beam splitter 30, the optical repeater 33 and the light guide plate 34, or provided on the mounting module 5.

(Description of State Before Lens 31 is Eccentric to Predetermined Value (Hereinafter, Referred to as "Reference State"))

Hereinafter, the reference state in the right image display module 10R will be described with reference to FIG. 11. Incidentally, the right image display module 10R of the reference state shown in FIG. 11 acts similarly to a monocular-type wearable image display device (image display module).

In FIG. 11, the image light L2 in the light guide plate 34 is guided from the right side to the left side by the light guide action of the light guide plate 34, and is reflected on the surface of the half mirror 4 on the way. The image light L2 reflected on the surface of the half mirror 4 is emitted to the outside from the front surface 341 of the light guide plate 34 and is incident on the right eye ER of the user. The image light L2 incident on the right eye ER of the user forms a virtual image in the space on the back surface 340 side of the light guide plate 34. Thus, an image is displayed, allowing the user to visually recognize the image.

Here, as shown in FIG. 11, a right line-of-sight GR connecting the right eye ER of the user and the displayed image PR is a perpendicular line perpendicular to the light guide plate 34. Further, the image PR is displayed on the right line-of-sight GR at a position separated from the right eye ER of the user by an image display distance D. The image display distance D is the distance from the right-eye ER to the position where the image PR is displayed. Incidentally, the right line-of-sight GR coincides with the right image display direction (direction to display the image PR). The left line-of-sight GL o is also similar to the right line-of-sight GR.

(Description of Alignment of Image in Reference State)

Hereinafter, an alignment of the image (virtual image) of the right image display module 10R in the reference state will be described with reference to FIG. 12. Incidentally, the right image display module 10R in the reference state shown in FIG. 12 acts similarly to a monocular-type wearable image display device (image display module).

Figure 12:
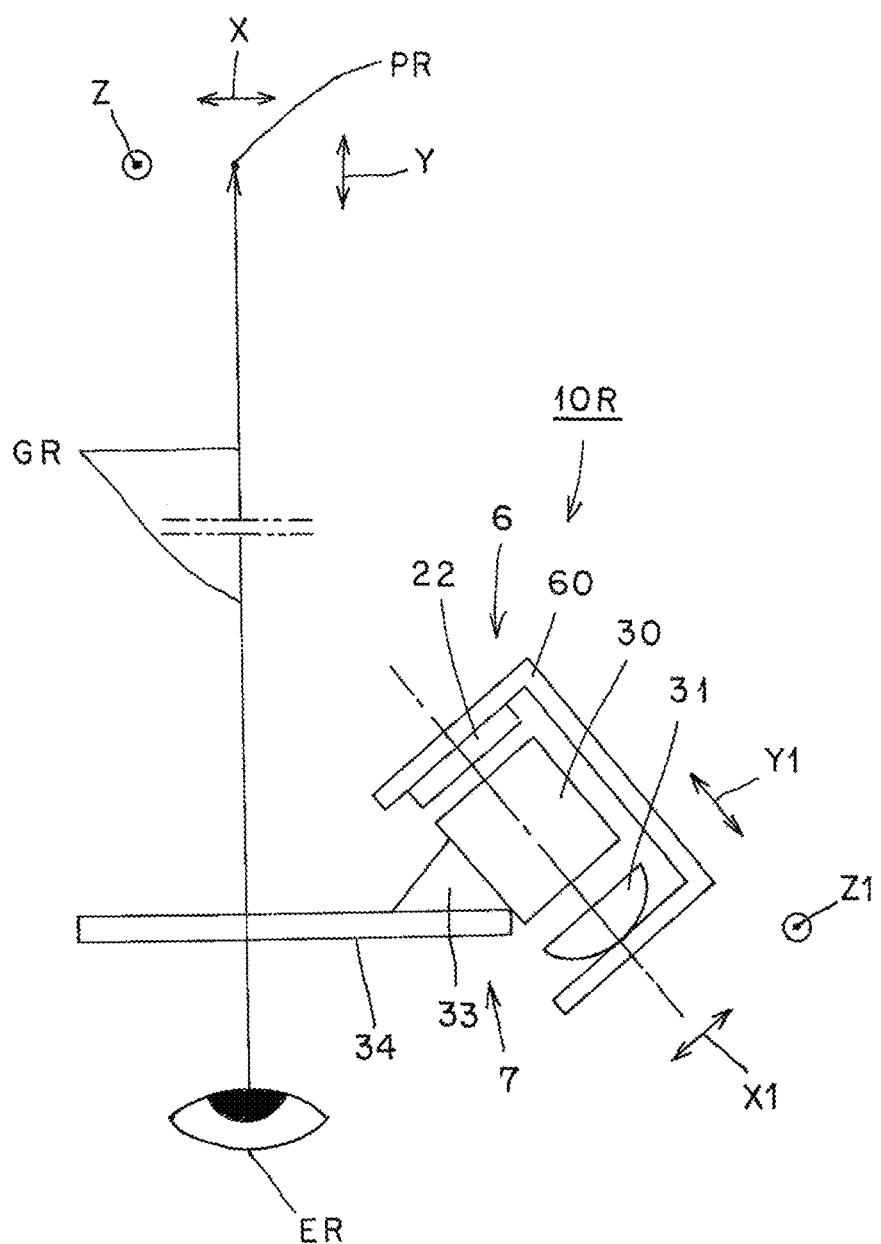
FIG. 12 is an explanatory diagram showing a state (reference state) before a lens is eccentric to a predetermined value in the right image display module, and a state in which an alignment of the image (virtual image) is adjusted by the movement of the lens (magnifying lens).

In FIG. 12, an alignment of the image (virtual image) PR is performed by moving the lens 31 relative to the reflective image modulation device 22.

That is, by moving the lens 31 in the direction of the solid line arrow X1 with respect to the reflective image modulation device 22, the position of the image PR viewed from the user is adjusted in the left-right direction X.

Further, by moving the lens 31 in the direction of the solid line arrow Y1 with respect to the reflective image modulation device 22, the position of the image PR viewed from the user is adjusted in the front-back direction Y.

Furthermore, by moving the lens 31 in the direction of the solid line arrow Z1 with respect to the reflective image modulation device 22, the position of the image PR viewed from the user is adjusted in the up-down direction Z.

By such adjustments of the left-right direction X and the up-down direction Z, the center of the lens 31 and the center of the reflective image modulation device 22 are aligned. Further, by the adjustment of the front-back direction Y, the image PR is displayed at the position of the image display distance D when viewed from the user.

As described above, the visible position of the image PR is adjusted, that is, aligned. The alignment of the image PR is performed in the manufacturing process of the wearable image display device. Then, as described above, the image PR of the right image display module 10R in the reference state is displayed on the right line-of-sight GR perpendicular to the light guide plate 34 at a position separated by the image display distance D when viewed from the user. In this way, the right image display module 10R in the reference state (that is, the monocular-type wearable image display device (image display module)) allows the right eye of the user to focus perpendicularly on the light guide plate 34.
(Description of Focusing of Binocular-Type Wearable Image Display Device)

Hereinafter, focusing of the binocular-type wearable image display device will be described with reference to FIG. 1.

As shown in FIGS. 11 and 12, the monocular-type wearable image display device focuses a single eye, that is, the right eye ER on the image PR perpendicular to the light guide plate 34. On the other hand, as shown in FIG. 1, the binocular-type wearable image display device is inclined inward at a predetermined angle to focus both eyes, that is, the right eye ER and the left eye EL on the image PC. Incidentally, this image PC (image PC of the binocular-type wearable image display device) is positioned at a point on the center line CL which is a linear perpendicular bisector connecting the right-eye ER and the left-eye EL, as shown in FIG. 1.

Then, in a general binocular-type wearable image display device, each of the monocular type wearable image display devices in combined in the left and right, and each of the left and right monocular type wearable image display devices is inclined inward at a predetermined angle for focusing
(Description of Alignment of Image in Wearable Image Display Device 1 According to this Embodiment)

Here, in a state where the alignment of the image of the monocular-type wearable image display device (image display module) is completed, the center of the lens 31 and the center of the reflective image modulation device 22 coincide with each other.

In contrast, in the wearable image display device 1 according to this embodiment, as shown in FIG. 1, the center of the lens 31 in a state where the center is aligned is disposed in a state eccentric to a predetermined value with respect to the center of the reflective image modulation device 22.

That is, in the right image display module 10R in FIG. 1, the lens 31 is disposed in a state eccentric to a predetermined value in the X1R direction with respect to the reflective image modulation device 22.

Thus, the image PR on the right side in the reference state moves in the solid line arrow XR direction (left direction) as shown in FIG. 1, and is positioned as the image PC on the center line CL. Along with this, the right line-of-sight GR in the reference state perpendicular to the light guide plate 34 becomes the right line-of-sight GRC that is on the center line CL side and faces the left side, as shown in FIG. 1.

Further, in the left image display module 10L in FIG. 1, the lens 31 is disposed in a state eccentric to a predetermined value in the X1L direction with respect to the reflective image modulation device 22.

Thus, the image PL on the left side in the reference state moves in the solid line arrow XL direction (right direction) and is positioned as the image PC on the center line CL, as shown in FIG. 1. Along with this, the left line-of-sight GL in the reference state perpendicular to the light guide plate 34 becomes the left line-of-sight GLC that is on the center line CL side and faces the right side, as shown in FIG. 1.

The right line-of-sight GRC and the left line-of-sight GLC are connected at the image PC on the center line CL, that is, at a point. As a result, the focusing of both eyes, that is, of the right eye ER and the left eye EL, is inclined inward at a predetermined angle and focused on the image PC.

(Description of Predetermined Value for Disposing Lens 31 in Eccentric State)

Hereinafter, a predetermined value for disposing the lens 31 in an eccentric state will be described with reference to FIGS. 13 and 14.

Figure 13:
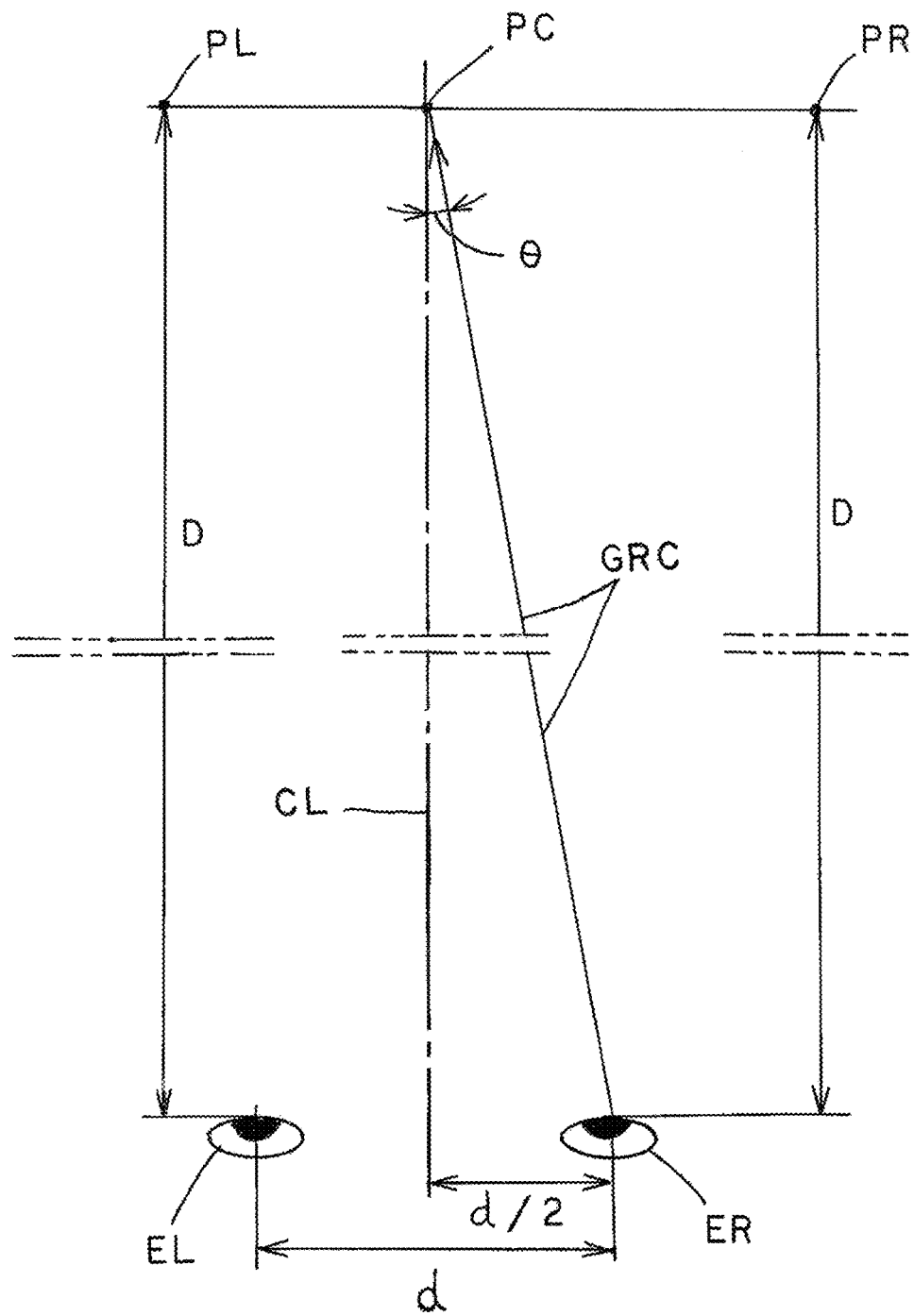
FIG. 13 is an explanatory diagram showing a state in which a lens is eccentric to a predetermined value in the right image display module and showing the condition of an equation for satisfying the predetermined value.

FIG. 13 is an explanatory diagram showing a state in which the lens 31 is eccentric to a predetermined value in the right image display module 10R and showing the condition of the following equation (1) for satisfying the predetermined value. FIG. 14 is an explanatory diagram showing the dimensions (part: mm) of the widths (width between pupils) d, d1, d2, d3 between the right eyes ER, ER1 ER2 ER3 and the left eyes EL1, EL2, EL3 EL4 of the Japanese.

The predetermined value is a value when the image PR of the right image display module 10R and the image PL of the left image display module 10L in the reference state are positioned as binocular images PC, PC1, PC2, and PC3 on the center line CL, respectively.

Further, the predetermined value is obtained from the image display distance D in at least one of the right image display module 10R and the left image display module 10L in the reference state, and a half of the width d (or spacing; hereinafter, referred to as "width between the left and right eyes") between the right eye ER and the left eye EL.

Then, the predetermined value satisfies the following equation (1).

That is, $\theta = \arctan\{(d/2)/D\}$ (1), where $\theta$ is the angle defined by the center line CL and the right line-of-sight GRC (or the left line-of-sight GLC) (see FIG. 13). d is the width between the left and right eyes (see FIG. 13). D is the image display distance in the right image display module 10R or the left image display module 10L in the reference state (see FIGS. 11 and 13).

Here, in the above equation (1), a specific numerical value is substituted to obtain a specific numerical value as the predetermined value that eccentricizes the lens 31.

First, the width d between the right and left eyes is an average value of multiple people in at least one of gender, age, and region. In this example, as shown in FIG. 14, the width d is 64 mm which is an average value of the Japanese.

FIG. 14 is an explanatory diagram showing an average value of a plurality of the Japanese living in Tokyo. That is, in an elderly female group (A), the average value of 100 persons is 61.1 mm. In an elderly male group (B), the average value of 100 persons is 64.4 mm. In a youth female group (C), the average value of 61 persons is 61.7 mm. In a youth male group (D), the average value of 56 persons is 64.1 mm. Thus, the average value of the width d between the left and right eyes of the Japanese is about 64 mm, and a range of the width d between the left and right eyes of the Japanese is said to be about 55 mm to about 71 mm.

Next, by determining the image display distance D, a specific numerical value as the predetermined value for eccentricity of the lens 31 is obtained. The image display distance D is 4000 mm (4 m) in this example. That is, the image display distance D for a person whose width d between the left and right eyes is about 64 mm is adjusted to 4000 mm. As a result, the angle $\theta$ is about 0.4°.

Then, the lens 31 is eccentric in the X1R direction and the X1R direction with respect to the reflective image modulation device 22 such that the angle $\theta$ defined by the center line CL, the right line of sight GRC and the left side line of sight GLC becomes about 0.4°. When the angle $\theta$ becomes 0.4°, the lens 31 is fixed to the mounting member 60.

(Description of Images PC and PC1, PC2, PC3, PC4)

Figure 15:
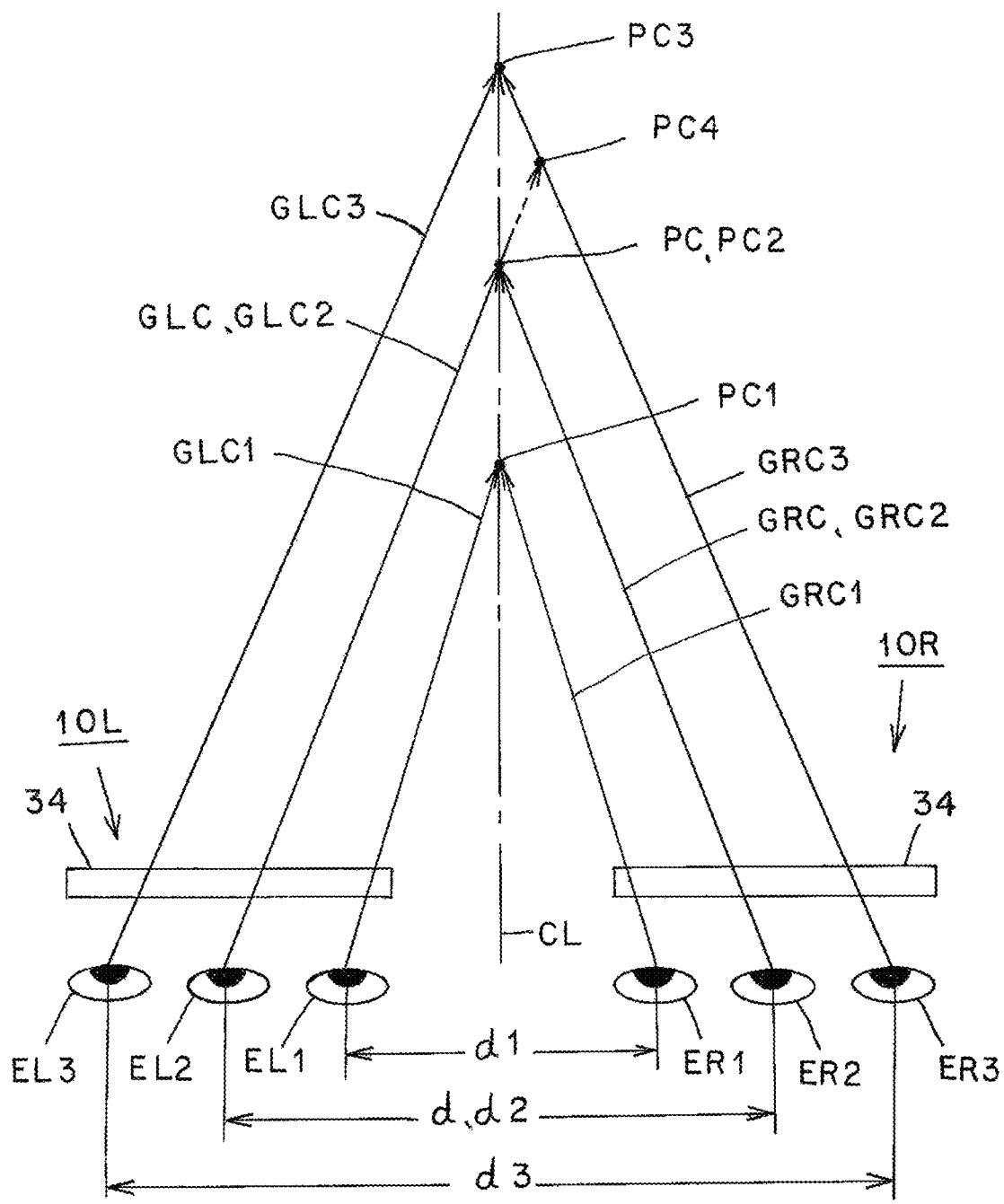
FIG. 15 is an explanatory diagram showing a state in which a right line-of-sight and a left line-of-sight of a user (wearer) are connected on a center line.

As described above, the image PC and PC1, PC2, PC3, PC4 in the wearable image display device 1 according to this embodiment are aligned as shown in FIG. 15.

That is, in the case of a person whose width d2 between the left and right eyes is about 64 mm, the right line-of-sight GRC2 from the right eye ER2 and the left line-of-sight GLC2 from the left eye EL2 are connected in the images PC and PC2 on the center line CL. The image display distance D in this case is 4000 mm.

Further in the case of a person whose width d1 between the left and right eyes is narrower than about 64 mm, the right line-of-sight GRC1 from the right eye ER1 and the left line-of-sight GLC1 from the left eye EL1 are connected in the image PC1 on the center line CL. The image display distance D in this case is shorter than 4000 mm.

Furthermore, in the case of a person whose width d1 between the left and right eyes is wider than about 64 mm, the right line-of-sight GRC3 from the right eye ER3 and the left line-of-sight GLC3 from the left eye EL3 are connected in the image PC3 on the center line CL. The image display distance D in this case is longer than 4000 mm.

Furthermore, in the case of a person whose width between the right eye ER3 and the center line CL is (d3/2) and whose the width between the left eye EL2 and the center line CL is (d2/2), the right line-of-sight GRC3 from the ER3 and the left line-of-sight GLC2 from the left eye EL2 (see solid line arrows and two-dot chain line arrows in FIG. 15) are connected in the image PC4 on the position shifted to the right from the center line CL. The image display distance D in this case is longer than 4000 mm.

As described above, the wearable image display device 1 according to this embodiment adjusts the image display distance D to about 4000 mm for a person whose width d between the left and right eyes is about 64 mm. Even in this case, as shown in FIG. 15, in the wearable image display device 1 according to this embodiment, even for a person whose widths d1 and d3 between the left and right eyes are about 55 mm to about 71 mm, the image PC1, PC3 and PC4 are aligned on the center line CL or near the left and right sides of the center line CL, although the image display distance D is not about 4000 mm.

Description of Operation in the Embodiment

The wearable image display device 1 according to this embodiment has the above-described configuration, and the operation thereof will be described below.

Figure 10:
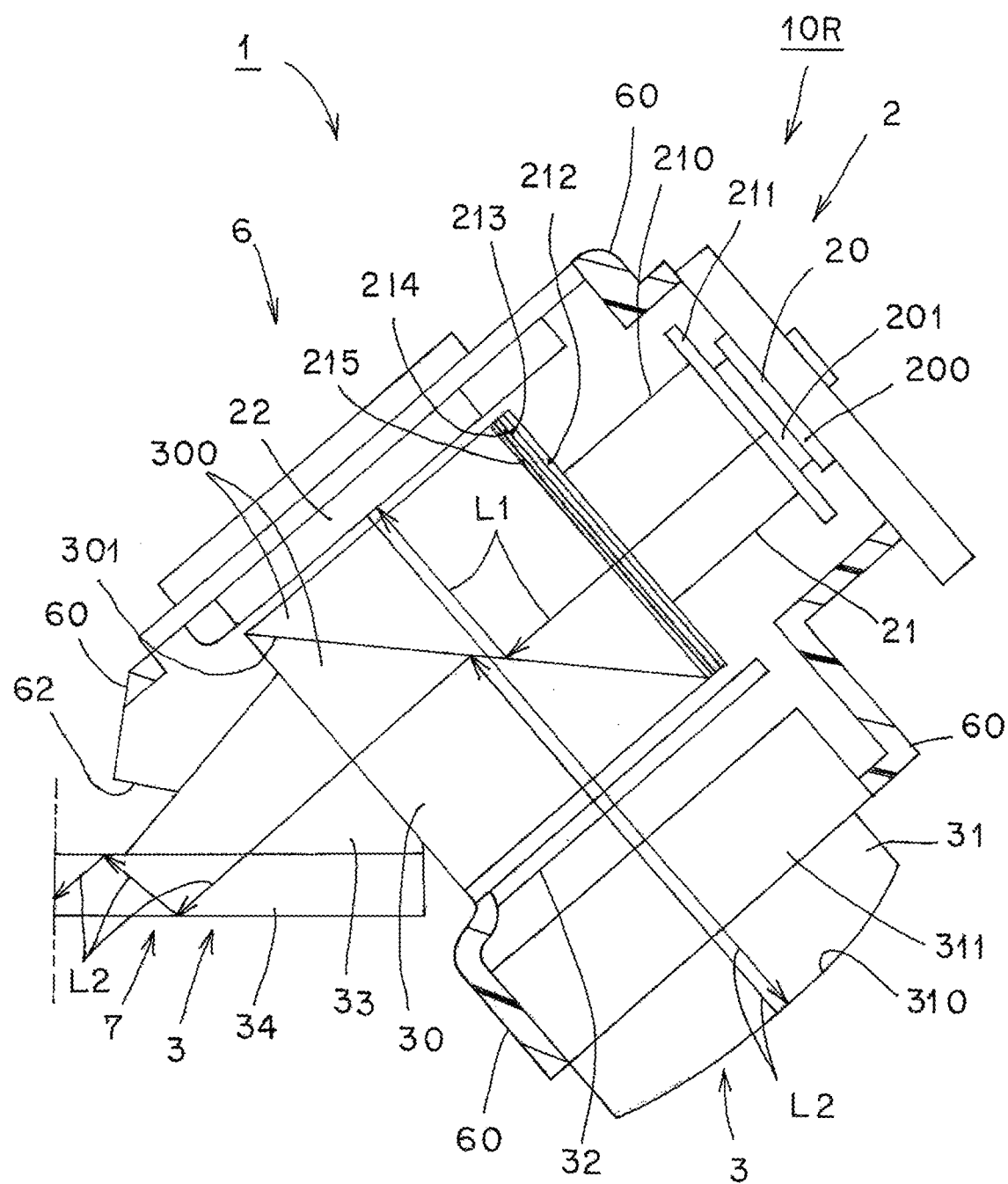
FIG. 10 is an explanatory diagram of a partially enlarged cross-section showing an optical path of image light in the right image display module.

The light source 20 is turned on. Then, as shown in FIG. 10, the light emitted from the light source 20 is regulated by the light regulation part 21 to become the regulated light L1 (light of S polarization component). The regulated light L1 is reflected on the reflective image modulation device 22 side by the polarizing beam splitter 30, and is reflected on the reflective image modulation device 22 to become the image light L2.

The image light L2 from the reflective image modulation device 22 is reflected on the lens 31 after transmitting through the polarizing beam splitter 30 and ¼λ wave plate 32, and transmits through the ¼λ wave plate 32. Thus, the image light L2 from the reflective image modulation device 22 transmitting through the ¼λ wave plate 32 twice becomes the light of S polarization component, and is reflected on the optical repeater 33 side by the polarizing beam splitter 30.

As shown in FIGS. 10 and 11, the image light L2 reflected on the optical repeater 33 side is relay-transmitted from the optical repeater 33 to the light guide plate 34, and is guided and transmitted through the light guide plate 34. The image light L2 guided and transmitted through the light guide plate 34 is reflected on the surfaces of the plurality of half mirrors 4 disposed in the light guide plate 34.

The image light L2 reflected on the surface of the half mirror 4 is emitted from the front surface 341 of the light guide plate 34 to the outside and is incident on the right eye ER and the left eye EL of the user. Thus, the user can visually recognize the image light L2 as an image of the space on the back surface 340 side of the light guide plate 34. At this time, the background light also transmits through the light guide plate 34 and the plurality of half mirrors 4 to be incident on the right-eye ER and left-eye EL of the user. Thus, the user can visually recognize the background together with the image.

Here, the adjustment screw 82 of the adjustment mechanism 8 is appropriately turned and screwed in or unscrewed. Then, the moving part 81 moves in the left-right direction X with respect to the fixing part 80. As a result, the right image display module 10R and the left image display module 10L can be moved in the left-right direction X via the adjustment mechanism 8.

Description of Effects of the Embodiment

The wearable image display device 1 according to this embodiment has the above-described configuration and operation, and the effect thereof will be described below.

In the wearable image display device 1 according to this embodiment, the lens 31 is disposed in a state eccentric to a predetermined value with respect to the reflective image modulation device 22. As a result, in the wearable image display device 1 according to this embodiment, the positions of the images PC, PC1, PC2, PC3, and PC4 (positions visually recognized by user) are adjusted to suit the majority of users. Thus, the wearable image display device 1 according to this embodiment eliminates the need to adjust the positions of the images PC, PC1, PC2, PC3, and PC4 every time the device is used.

In the wearable image display device 1 according to this embodiment, the predetermined value of the eccentricity of the lens 31 is a value such that the image PR on the right side and the image PL on the left side in the reference state move in the solid line arrow XR direction (left direction) and in the solid line arrow XL (right direction) as shown in FIG. 1, and are displayed as the image PC on the center line CL.

Moreover, in the wearable image display device 1 according to this embodiment, the predetermined value of the eccentricity of the lens 31 is a value such that the right line-of-sights GRC, GRC1, GRC2, GRC3 and the left side line-of-sights GLC, GLC1, GLC2, GLC3 are connected on the center line CL.

As a result, the wearable image display device 1 according to this embodiment is adjusted so that the positions of the images PC, PC1, PC2, PC3 and PC4 are more suitable for the majority of users. Thus, the wearable image display device 1 according to this embodiment eliminates the need to adjust the positions of the images PC, PC1, PC2, PC3 and PC4 every time the device is used.

In the wearable image display device 1 according to this embodiment, the predetermined value of the eccentricity of the lens 31 is a value obtained from the image display distance D and one half of the width d between the left and right eyes. As a result, the wearable image display device 1 according to this embodiment is adjusted so that the positions of the images PC, PC1, PC2, PC3, and PC4 are more suitable for the majority of users. Thus, the wearable image display device 1 according to this embodiment eliminates the need to adjust the positions of the images PC, PC1, PC2, PC3, and PC4 every time the device is used.

In the wearable image display device 1 according to this embodiment, the predetermined value of the eccentricity of the lens 31 is a value that satisfies θ=arctan {(d/2)/D}. As a result, the wearable image display device 1 according to this embodiment is adjusted so that the positions of the images PC, PC1, PC2, PC3 and PC4 are more suitable for the majority of users. Thus, the wearable image display device 1 according to this embodiment eliminates the need to adjust the positions of the images PC, PC1, PC2, PC3 and PC4 every time the device is used.

The wearable image display device 1 according to this embodiment uses a value obtained from the average of the Japanese as the width d between the left and right eyes, but depending on the country or region where the device is sold, it is desirable to correct the width d in consideration of an average value of the people living there. In this case, the width d shall be obtained from the average value of multiple people in at least one of gender, age or region. As a result, the wearable image display device 1 according to this embodiment is adjusted so that the positions of the images PC, PC1, PC2, PC3 and PC4 are more suitable for the majority of users. Thus, the wearable image display device 1 according to this embodiment eliminates the need to adjust the positions of the images PC, PC1, PC2, PC3 and PC4 every time the device is used.

In the wearable image display device 1 according to this embodiment, the image display side portion (first component) 7 having the polarizing beam splitter 30, the light guide plate 34 and the plurality of half mirrors 4, and the image source side portion (second component) 6 having the reflective image modulation device 22 and the lens 31 are separately provided as a part structure, and the image display side portion 7 is attached to the mounting module 5, and the image source side portion 6 is detachably attached to the image display side portion 7.

As a result, the wearable image display device 1 according to this embodiment can freely change and set the image source side portion 6 with respect to the image display side portion 7. Thus, the wearable image display device 1 according to this embodiment can freely change and set a FOV (viewing angle) and the resolution, and easily manufacture products having different a FOV (viewing angle) and the resolution. Moreover, the wearable image display device 1 according to this embodiment can freely combine a focal length of the lens 31, the size of the reflective image modulation device 22 (image output device), and the like.

In the wearable image display device 1 according to this embodiment, the image source side portion 6 and the image display side portion 7 are separately provided as a part structure. Thus, the wearable image display device 1 according to this embodiment can attach and detach the image source side portion 6 and the image display side portion 7 to/from each other. As a result, the wearable image display device 1 according to this embodiment can be easily maintained, and also can be simply used.

That is, the wearable image display device 1 according to this embodiment, by removing the image source side portion 6 and the image display side portion 7 from the device, can easily maintain the image source side portion 6 and the image display side portion 7 separately. Further, the wearable image display device 1 according to this embodiment, by attaching the image source side portion 6 and the image display side portion 7 to the device, the image source side portion 6 and the image display side portion 7 are integrated, which makes it possible to simply use the wearable image display device 1. Furthermore, in the wearable image display device 1 according to this embodiment, the image source side portion 6 and the image display side portion 7 can be manufactured separately and efficiently.

In the wearable image display device 1 according to this embodiment, the positions of the right image display module 10R and the left image display module 10L can be adjusted in the left-right direction X, which is the direction of connecting the right eye ER and left eye EL of the user, with respect to the mounting module 5 via the adjustment mechanism 8. As a result, the wearable image display device 1 according to this embodiment is adjusted so that the positions of the images PC, PC1, PC2, PC3, and PC4 are more suitable for the majority of users.

Moreover, since the wearable image display device 1 according to this embodiment can move and adjust the positions of the right image display module 10R and the left image display module 10L in the left-right direction X with respect to the mounting module 5, the length of the light guide plate 34 in the left-right direction X can be shortened. Thus, the wearable image display device 1 according to this embodiment can suppress the loss of light incident on the eyes from the light guide plate 34.

Figure 16A:
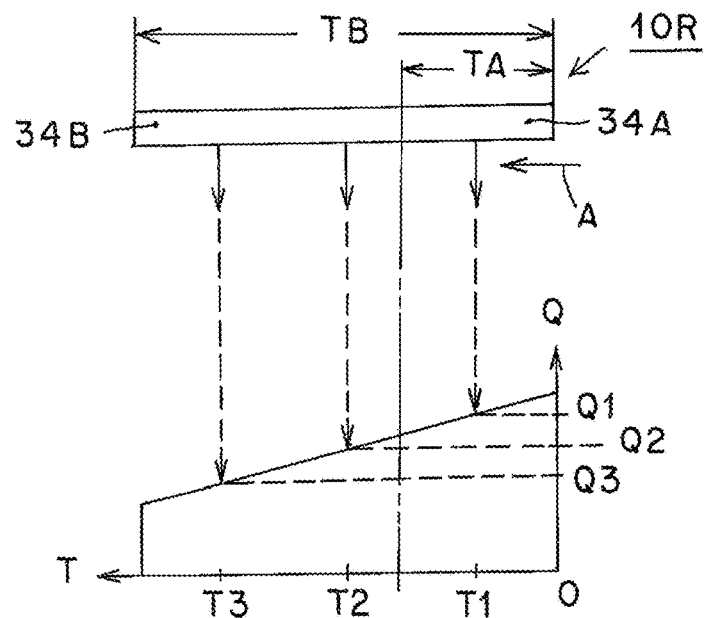
FIG. 16A is an explanatory diagram showing an effect obtained by adjusting a position of the right image display module in the right image display module, and showing light guide plates having different lengths in the light guiding direction (left-right direction) and a state of the resulting loss of light quantity (attenuation).
Figure 16B:
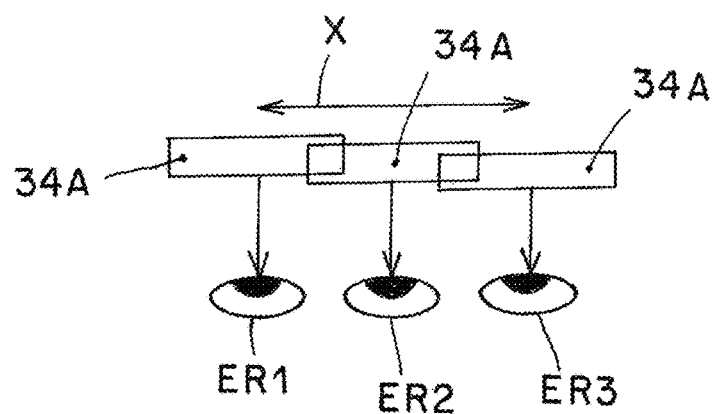
FIG. 16B is an explanatory diagram showing the effect obtained by adjusting a position of the right image display module, and showing a state in which a light guide plate having a short length in the light guiding direction (left-right direction) is adjusted.
Figure 16C:
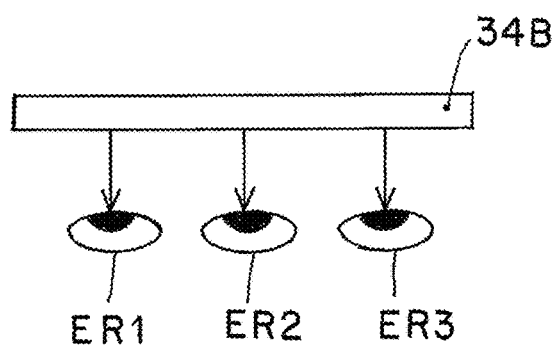
FIG. 16C is an explanatory diagram showing the effect obtained by adjusting a position of the right image display module, and showing a state in which a light guide plate having a long length in the light guiding direction (left-right direction) is fixed.

Hereinafter, a relative relationship between the length of the light guide plate 34 in the left-right direction X and the loss of light incident on the eyes from the light guide plate 34 will be described with reference to FIG. 16A to FIG. 16C. FIG. 16A to FIG. 16C are explanatory diagrams illustrating an effect obtained by adjusting a position of the right image display module in the right image display module. FIG. 16A is an explanatory diagram showing light guide plates having different lengths in the light guiding direction (left-right direction) and a state of the resulting loss of a light quantity (attenuation). FIG. 16B is an explanatory diagram showing a state in which a light guide plate having a short length in the light guiding direction (left-right direction) is adjusted. FIG. 16C is an explanatory diagram showing a state in which a light guide plate having a long length in the light guiding direction (left-right direction) is fixed.

In the upper side of FIG. 16A, reference numeral "34A" is a light guide plate of this embodiment having a short length TA in the light guiding direction (in the direction of arrow A and in the left-right direction). Reference numeral "34B" is a light guide plate of a comparative example in which the length TB in the light guiding direction is longer than the length TA of the light guide plate 34A of this embodiment. The light incident on the light guide plates 34A and 34B is guided in the direction of arrow A.

In the lower side of FIG. 16A, the vertical axis indicates the amount of light Q emitted from the surface of the light guide plates 34A and 34B. Further, the horizontal axis indicates the length T in the arrow A direction of the surface of the light guide plates 34A and 34B. Furthermore, the right end of the light guide plate 34A in this embodiment (the end on the side where light is incident) and the right end of the light guide plate 34B in the comparative example are aligned. Assuming that the length T at the right ends of the light guide plates 34A and 34B is set to "0". The length T of the light guide plate 34A in this embodiment has a length between "T1" and "T2". On the other hand, the length T of the light guide plate 34B in the comparative example has a length longer than that of "T3".

Here, the light quantity emitted from the right ends of the light guide plates 34A and 34B is maximum. On the other hand, the light quantity of the light emitted from the left ends of the light guide plates 34A and 34B is minimal. As a result, a light quantity Q1 of the light emitted from the location of the length T1 of the light guide plates 34A and 34B is large. Further, a light quantity Q2 of the light emitted from the location of the length T2 of the light guide plate 34B is small in comparison with the light quantity Q1. Furthermore, A light quantity Q3 of the light emitted from the location of the length T3 of the light guide plate 34B is small in comparison with the light quantity Q1 and Q2.

Thus, the light guide plate 34A in this embodiment having a short length TA in the light guiding direction can suppress the loss of light incident on the eyes in comparison with the light guide plate 34B in the comparative example in which the length TB in the light guiding direction is longer than the length TA of the light guide plate 34A in this embodiment.

In FIG. 16B, the light guide plate 34A in this embodiment having the short length TA in the light guiding direction can be moved in the left-right direction X with respect to the mounting module 5 by the adjustment mechanism 8 as described above. As a result, the light guide plate 34A in this embodiment can make light having a large light quantity Q1 incident on the eyes ER1, ER2, and ER3 of the majority of users.

On the other hand, in FIG. 16C, the light guide plate 34B in the comparative example in which the length TB in the light guiding direction is longer than the length TA of the light guide plate 34A in this embodiment is a fixed type, and makes light to be incident on the eyes ER1, ER2, and ER3 of the majority of users. However, in the light guide plate 34B in the comparative example, since the length TB in the light guiding direction is longer than the length TA of the light guide plate 34A in this embodiment, the light quantity Q2 and Q3 are smaller toward the left end than the light quantity Q1 of the light emitted from the location T1. As a result, according to the light guide plate 34B in the comparative example, the user of the eye ER3 can view the image with the light which the light quantity Q1 is large, but the user of the eyes ER2 and ER1 can view the image only with the light which the light quantity Q2 and Q3 is small.

In contrast, according to the light guide plate 34A in this embodiment, although the adjustment mechanism 8 is required, the majority of users of the eyes ER1, ER2, and ER3 can view the image with the light which the light quantity Q1 is large.

The wearable image display device 1 according to this embodiment includes the fixing part 80 in which the adjustment mechanism 8 is attached to the mounting module 5, the moving part 81 to which the right image display module 10R and the left image display module 10L are attached and that is movably attached to the fixing part 80 in the left-right direction X, and the adjustment screw 82 and the spring 83 capable of adjusting the position of the moving part 81 with respect to the fixing part 80 as the adjustment part. As a result, the wearable image display device 1 according to this embodiment ensures that the positions of the right image display module 10R and the left image display module 10L are adjusted in the left-right direction X with respect to the mounting module 5 via the adjustment mechanism 8.

Description of Examples Other than the Embodiment

In the above-described embodiment, the eyeglass-type mounting module 5 that is detachably mounted to the face of the user is used. However, in the present invention, a mounting module other than the eyeglass-type one may be used. For example, a goggle type or a cap type mounting module may be used.

Further, in the above embodiment, the lens 31 is eccentric to both the right image display module 10R and the left image display module 10L. However, in the present invention, the lens 31 may be eccentric to either the right image display module 10R or the left image display module 10L. In this case, the image viewed from the both eyes (right eyes ER, ER1, ER2, ER3 and left eyes EL, EL1, EL2, EL3) is displayed at a position shifted to the right side (see image PC4 in FIG. 15) or to the left side with respect to the center line CL on a linear perpendicular bisector connecting the right eyes ER, ER1, ER2, ER3 and left eyes EL, EL1, EL2, EL3.

Furthermore, in the above embodiment, the right image display module 10R and the left image display module 10L are attached to the mounting module 5 via the adjustment mechanism 8. However, in the present invention, the right image display module 10R or the left image display module 10L may be attached to the mounting module 5 via the adjustment mechanism 8. Further, in the present invention, the right image display module 10R and the left image display module 10L may be directly attached to the mounting module 5 without via the adjustment mechanism 8.

Furthermore, in the above embodiment, the light guide plate 34 on the image display side portion (first component) 7 of the right image display module 10R and the left image display module 10L is attached to the left and right ends of the front portion 50 of the mounting module 5 via the adjustment mechanism 8. However, in the present invention, for example, the mounting member 60 on the image source side portion (second component) 6 of the right image display module 10R and the left image display module 10L may be attached to the left and right ends of the front portion 50 of the mounting module 5 via the adjustment mechanism 8 or may be directly attached thereto without via the adjustment mechanism 8. In this case, the image display side portion (first component) 7 and the image source side portion (second component) 6 of the right image display module 10R and the left image display module 10L form an integral structure.

Furthermore, in the above embodiment, the right image display module 10R and the left image display module 10L are attached to the left and right ends of the front portion 50 of the mounting module 5 via the adjustment mechanism 8. However, in the present invention, the right image display module 10R and the left image display module 10L may be directly attached to a portion other than the left and right ends of the front portion 50 of the mounting module 5 without via the adjustment mechanism 8.

Furthermore, in the above embodiment, the right image display module 10R and the left image display module 10L can be adjusted in the left-right direction X with respect to the mounting module 5 by the adjustment mechanism 8. However, in the present invention, the right image display module 10R and the left image display module 10L may be adjustable in a direction other than the left-right direction X with respect to the mounting module 5.

For example, the adjustment mechanism may allow the right image display module 10R and the left image display module 10L to be adjusted in the up-down direction Z or the other direction with respect to the mounting module 5. In this case, the adjustment mechanism 8 in the above embodiment may be used.

Further, in the above embodiment, the reflective image modulation device 22 of the reflective liquid crystal (LCOS) is described as the image output device. However, in the present invention, the image output device may be a device other than the reflective image modulation device 22 of the reflective liquid crystal (LCOS). For example, the device may be a reflective mirror device such as DLP (TM), or a transmissive device. The entire image light output part 2 may also be an image output device that emits light by an organic LED. Incidentally, in the case of using a transmission type device, a transmission type lens is used.

Further, in the above embodiment, when the wearable image display device 1 is mounted on the face of the user via the mounting module 5, the front surface 341 and the back surface 340 of the light guide plate 34 are parallel to the left-right direction X as an example. However, in the present invention, when the wearable image display device 1 is mounted on the face of the user via the mounting module 5, the front surface 341 and the back surface 340 of the light guide plate 34 may be inclined with respect to the left-right direction X (slight inclination).

Note that the present invention is not limited to the above-described embodiment. For example, the specific numerical value 64 mm of the width d between the left and right eyes, and the specific numerical value 4000 mm of the image display distance D are not limited.

DESCRIPTION OF SYMBOLS

1 Wearable image display device
10R Right image display module
10L Left image display module
2 Image light output part
20 Light source
200 Substrate
201 LED
21 Light regulation part
210 Reflective sheet duct
211 First diffusion sheet
212 Second diffusion sheet
213 Prism sheet
214 Wire grid film
215 Polarizing plate
22 Reflective image modulation device (image output device)
3 Image light transmitting part
30 Polarizing beam splitter
300 Right-angled prism
301 Wire grid film
31 Lens
310 Reflecting surface
311 Lens part
32 ¼λ, wave plate
33 Optical repeater
34 Light guide plate
34A Light guide plate of this embodiment
34B Light guide plate of comparative example
340 Back surface
341 Front surface
4 Image light emitting part (half mirror)
5 Mounting module
50 Front portion
51,51 Temple portion
52,52 Hinge
53 Nose pad
6 Image source side portion (second component)
60 Mounting member
61 Space
62 Opening
7 Image display side portion (first component)
8 Adjustment mechanism
80 Fixing part
81 Moving part
82 Adjustment screw (adjustment part)
83 Spring (Adjusting part)
84 Space portion
85 Guide part
86 Mounting bracket
A Light guiding direction
CL Center line
d, d1, d2, d3 Width between right and left eyes
D Image display distance
EL, EL1, EL2, EL3 left eye
ER, ER1, ER2, ER3 right eye GL, GLC, GLC1, GLC2, GLC3 left line-of-sight
GR, GRC, GRC1, GRC2, GRC3 right line-of-sight
L1 Regulated light
L2 Image light
PC, PC1, PC2, PC3, PC4 image (image by both eyes (right and left eyes))
PL image (monocular (left-eye) image)
PR image (monocular (right-eye) image)
Q, Q1, Q2, Q3 light quantity
T, T1, T2, T3 length
TA Length of light guide plate 34A in this embodiment
TB Length of light guide plate 34B in comparative example
X Left-right direction
Y Front-back direction
Z Up-down direction
X1 Adjustment direction in left-right direction
Y1 Adjustment direction in front-back direction
Z1 Adjustment direction in up-down direction
XL Right direction
XR Left direction
X1L Adjustment direction in left direction e
X1R Adjustment direction in right direction

The invention claimed is:

1. An wearable image display device comprising:
a mounting module mounted on a face of a user;
a right image display module arranged on a right side of the mounting module so as to correspond to a right eye of the user; and
a left image display module arranged on a left side of the mounting module so as to correspond to a left eye of the user, wherein
each of the right image display module and the left image display module includes:
an image output device outputting an image as an image light;
a light guide plate making the image light output from the image output device incident and guiding the incident image light by a light guiding action;
a lens being provided on an optical path between the image output device and the light guide plate, and being movable in a direction orthogonal to an optical axis direction of the image output device; and
a plurality of half mirrors, which are disposed in the light guide plate, making the image light guided through the light guide plate incident on the right eye from a surface of the light guide plate in the case of the right image display module, making the image light incident on the left eye from a surface of the light guide plate in the case of the left image display module, and displaying the image in a space of a back surface side of the light guide plate, wherein
in at least one of the right image display module and left image display module, the lens is held in a state of eccentricity to a predetermined value with respect to the image output device by moving in a direction orthogonal to the optical axis direction of the image output device from a reference state where the center of the of the lens is aligned with the center of the image output device, and the predetermined values are an angle between a perpendicular bisector and a right line of sight, which is a right image display direction in which the image is displayed on the right image display module, or a left line of sight, which is a left image display direction in which the image is displayed on the left image display module, when the right image display direction, which is a direction in which the image is displayed on the right image display module, and the left image display direction, which is a direction in which the image is displayed on the left image display module, intersect at a point on the perpendicular bisector of a line connecting the right eye and the left eye, when a state before the lens is eccentric is a reference state, the predetermined value is obtained from:
- either a right image display distance in the right image display module in the reference state, which is a distance from the right eye to a position where the image is displayed, or a left image display distance in the left image display module in the reference state, which is a distance from the left eye to a position where the image is displayed; and
- a half of a width between the right eye and the left eye.

2. The image display device according to claim 1, wherein the predetermined value satisfies the following equation (1):

$$\theta = \arctan\{(d/2)/D\} \quad (1),$$

where $\theta$ is an angle define by a center line which is a linear perpendicular bisector connecting the right eye and the left eye, and a right line-of-sight or a left line-of-sight which is a line segment from the right eye or the left eye to a point on the center line, where d is a width between the right eye and the left eye, and where D is, either a right image display distance in the right image display module in the reference state, which is a distance from the right eye to a position where the image is displayed, or a left image display distance in the left image display module in the reference state, which is a distance from the left eye to a position where the image is displayed.

3. The image display device according to claim 1, wherein the width is obtained from an average value of multiple people in at least one of gender, age and region.

4. The image display device according to claim 1, wherein in at least one of the right image display module and the left image display module, a first component including the light guide plate and the plurality of half mirrors and a second component including the image output device and the lens are separately provided as a part structure, the first component is attached to the mounting module, and the second component is detachably attached to the first component.

5. The image display device according to claim 4, wherein an adjustment mechanism is provided between the mounting module and at least one of the right image display module and the left image display module, and the adjustment mechanism allows at least one position of the right image display module and the left image display module to be adjusted with respect to the mounting module.

6. The image display device according to claim 5, wherein the adjustment mechanism includes:

a fixing part attached to the mounting module;

a moving part to which at least one of the right image display module and the left image display module is attached, and that is movably attached to the fixing part; and an adjustment part capable of adjusting a position of the moving part with respect to the fixing part.

* * * * *